J. E. PECKHAM.
SHANK STIFFENER
APPLICATION FILED MAR. 21, 1918.
1,352,024.
Patented Sept. 7, 1920.
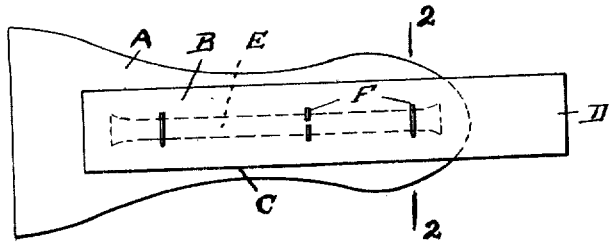
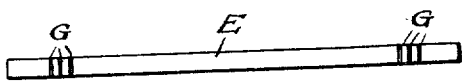
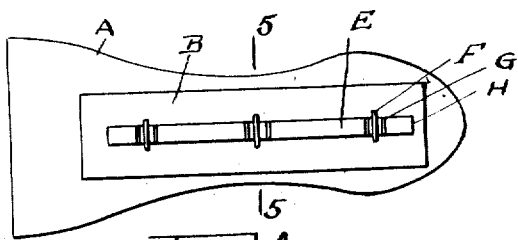
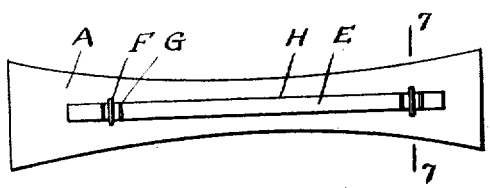
Inventor
Joseph E. Peckham
By
Attorney

UNITED STATES PATENT OFFICE.

JOSEPH E. PECKHAM, OF NEWTON HIGHLANDS, MASSACHUSETTS.

SHANK-STIFFENER.

1,352,024.  Specification of Letters Patent.  Patented Sept. 7, 1920.

Application filed March 21, 1918. Serial No. 223,810.

*To all whom it may concern:*

Be it known that I, JOSEPH E. PECKHAM, a citizen of the United States, residing at Newton Highlands, county of Middlesex, Commonwealth of Massachusetts, have invented certain new and useful Improvements in Shank-Stiffeners, of which the following is a specification.

This invention relates to improvements in shank stiffeners for shoes, and particularly to a shank having a metallic reinforcement.

One of the difficulties in such shanks lies in the tendency of the metallic reinforcement to work relative to the shank piece thus producing wear and ultimate dislocation which sometimes results in the ruin of the shoe. Owing to the nature of these articles, it is of great importance that simplicity of structure and ease of manufacture be maintained and it is to these ends that my present invention is directed.

It is furthermore important to provide a filling member at the heel seat and to do this without any considerable increase in expense and while preserving the strength of the structure in whole.

I accomplish these results, briefly, by employing a metallic reinforcement of extremely simple form and fastening it by simple and usual means but in such manner as to secure permanence of its position so as to avoid any possible wear. I am enabled to combine by an overlapped or spliced construction of the shank a satisfactory filling element in combination with the other features.

The construction and manner of producing my shank stiffener, together with several embodiments thereof which I have found satisfactory in use and well adapted to the requirements of manufacture, is fully disclosed in the accompanying specification and drawings, throughout which like reference characters are correspondingly employed, and is particularly pointed out in the appended claims.

Figure 1 is a plan view of one form of shank stiffener constructed in accordance with my invention.

Fig. 2 is a transverse section thereof on the line 2—2 of Fig. 1.

Fig. 3 is a plan view of the metallic reinforcement, removed, and particularly illustrating the transverse scoring which assists to maintain the reinforcement immovably in position.

Fig. 4 is a plan view of another embodiment of my invention.

Fig. 5 is a transverse section thereof on the line 5—5 of Fig. 4.

Fig. 6 is a plan view of still another form of shank stiffener in accordance with my invention, and Fig. 7 is a transverse section thereof on the line 7—7 of Fig. 6.

I have indicated at A in each figure, a piece of flexible material, such as leatherboard, constituting the main body portion of my shank stiffener, and at B, Figs. 1 to 5 inclusive, a heel seat filling element which may be conveniently made of the same material. The member A is preferably slightly curved longitudinally, and the member B may be correspondingly curved and overlapped and spliced to the member A in any suitable manner.

As shown in Figs. 1 and 2, the member A has a relatively shallow groove C produced longitudinally in its upper face to provide a seat for member B, the opposing faces of said members being adhesively coated to prevent displacement. In Fig. 1 member B is also extended rearwardly beyond the end of the underlying body portion A to provide an extension D by means of which the shank stiffener as a whole may be additionally anchored in position within the shoe. It is contemplated that member B may be made of stock of half-thickness.

In each embodiment member A is reinforced by a resiliently stiff metallic reinforcement E. The reinforcement E as here shown is formed of a thin flat strip of spring stock which may be slightly bent longitudinally to further increase its resiliency, and is immovably held in position by a plurality of staples F, or equivalent fastenings, which closely embrace it and are driven through the stock and clenched therein.

In order to insure positive grip of the connecting portions of the staples upon the flat exposed face of the reinforcement E, said reinforcement is scored or otherwise roughened at appropriate points to provide a plurality of relatively shallow transverse grooves or recesses G in which the connecting portions of the staples may positively seat, thus restraining the reinforcement against longitudinal movement relative to member A upon flexure of the shank stiffener as a whole, in the use of the shank stiffener.

In the form illustrated in Figs. 1 and 2, the reinforcement is incorporated in the shank stiffener between the members A and B, one of said members being preferably provided with a longitudinal groove H to receive the reinforcement. The reinforcement is thus covered so as to protect the shoe from injury.

In the form illustrated in Figs. 4 and 5, the groove H is formed in the upper face of the member B, while in Fig. 6 said groove is formed in the upper face of the member A.

In both forms the staples F assist to retain the members A and B in their superposed overlapping relation, as well as securing the reinforcement E against displacement from its seat H and against longitudinal movement relative to said members under the flexure of the shank stiffener. The reinforcement E, moreover, being flat, has no tendency to turn axially in the groove H. The member B affords stiffness to the device as a whole, as well as to assisting to prevent the staples from tearing out under flexure of the device in use.

In the form illustrated in Figs. 6 and 7, the member A is represented as being of one piece construction, but obviously this member might be made of two overlapping spliced pieces, the uppermost of which could constitute a heel seat filling member.

Various other modifications in the form and construction of my device may obviously be resorted to if within the limits of the appended claims.

What I therefore claim and desire to secure by Letters Patent is:

1. A shank stiffener comprising a body portion, a resiliently-stiff reinforcing element seated on said body portion and scored to provide an anchoring groove for a staple, and a staple having its legs embedded in the body portion at either longitudinal edge of the reinforcing element and having its cross-bar lodged in said groove of the reinforcing element and securing said element against relative movement on said body portion.

2. A shank stiffener comprising a flexible body portion longitudinally curved and provided on its convex face with a longitudinally extending relatively shallow groove, a flat resiliently-stiff reinforcing element seated in said groove and transversely scored to provide an anchoring groove for a staple, and a staple having its legs closely embracing said stiffening element at either longitudinal edge thereof, and having its cross-bar lodged in said groove of the reinforcing element and securing said element against relative movement in said groove.

3. A shank stiffener comprising a body portion longitudinally curved, a heel seat filling element anchored to said body portion and correspondingly curved, a resiliently stiff reinforcement member for said body portion having a portion of one face grooved, and a fastening set through said body portion and heel seat element to prevent relative movement thereof, and engaging the groove of the stiffening member to restrain said member against longitudinal and axial movement relative to the body portion.

In testimony whereof I affix my signature in presence of two witnesses.

JOSEPH E. PECKHAM.

Witnesses:
VICTORIA LOWDEN,
GEORGE B. RAWLINGS.